United States Patent [19]

Shimomura et al.

[11] Patent Number: 5,354,369
[45] Date of Patent: Oct. 11, 1994

[54] INK, INK-JET RECORDING PROCESS MAKING USE OF THE INK, AND EQUIPMENT THEREFOR

[75] Inventors: Masako Shimomura, Yokohama; Hiromichi Noguchi, Atsugi, both of Japan

[73] Assignee: Canon Kabushiki Kaisha, Tokyo, Japan

[21] Appl. No.: 56,410

[22] Filed: May 4, 1993

[30] Foreign Application Priority Data

May 13, 1992 [JP] Japan .................................. 4-120712
Apr. 20, 1993 [JP] Japan .................................. 5-093189

[51] Int. Cl.$^5$ .............................................. C09D 11/02
[52] U.S. Cl. ................................ 106/22 H; 106/20 R; 106/20 D; 106/22 K
[58] Field of Search ............... 106/22 H, 22 K, 23 H, 106/20 R, 20 D; 346/1.1

[56] References Cited

U.S. PATENT DOCUMENTS

| | | | |
|---|---|---|---|
| 4,325,735 | 4/1982 | Ohta et al. | 106/22 K |
| 4,840,674 | 6/1989 | Schwarz | 106/20 R |
| 5,017,224 | 5/1991 | Tomita et al. | 106/22 H |
| 5,019,164 | 5/1991 | Tomita et al. | 106/20 R |
| 5,160,370 | 11/1992 | Suga et al. | 106/20 R |
| 5,172,133 | 12/1992 | Suga et al. | 346/1.1 |
| 5,173,112 | 12/1992 | Matrick et al. | 106/22 H |
| 5,184,148 | 2/1993 | Suga et al. | 346/1.1 |
| 5,250,109 | 10/1993 | Chan et al. | 106/22 H |

FOREIGN PATENT DOCUMENTS

| | | |
|---|---|---|
| 434179 | 6/1991 | European Pat. Off. . |
| 56-4488 | 1/1981 | Japan . |
| 56-88473 | 7/1981 | Japan . |
| 57-74372 | 5/1982 | Japan . |
| 57-31759 | 7/1982 | Japan . |
| 60-42834 | 9/1985 | Japan . |
| 61-055552 | 11/1986 | Japan . |
| 61-55552 | 11/1986 | Japan . |
| 62-1765 | 1/1987 | Japan . |
| 62-74973 | 4/1987 | Japan . |
| 64-6236 | 2/1989 | Japan . |
| 1203483 | 8/1989 | Japan . |
| 2173168 | 7/1990 | Japan . |
| 3234775 | 10/1991 | Japan . |
| 4-85375 | 3/1992 | Japan . |
| 4332777 | 11/1992 | Japan . |
| 741750 | 12/1955 | United Kingdom . |
| 1561187 | 2/1980 | United Kingdom . |
| 2055116 | 2/1981 | United Kingdom . |

*Primary Examiner*—Helene Klemanski
*Attorney, Agent, or Firm*—Fitzpatrick, Cella, Harper & Scinto

[57] ABSTRACT

Provided is an ink containing a recording agent and a liquid medium capable of dissolving or dispersing the recording agent, wherein said ink comprises a compound represented by the formula $$R_1R_2NCONHCH_2CH_2OH$$

wherein $R_1$ and $R_2$ each represent hydrogen or $C_nH_{2n}OH$, where n is 2 or 3, provided that $R_1$ and $R_2$ are not hydrogen at the same time, and has a pH of not less than 7 to less than 10.

18 Claims, 3 Drawing Sheets

INK, INK-JET RECORDING PROCESS MAKING USE OF THE INK, AND EQUIPMENT THEREFOR

BACKGROUND OF THE INVENTION

1. Field of the Invention

The present invention relates to an ink for ink-jet recording, an ink-jet recording process making use of the ink, and equipment therefor.

2. Related Background Art

As inks for ink-jet recording, those prepared by dissolving or dispersing a dye or pigment of various types in a liquid medium comprised of water or water and an organic solvent are hitherto known and are used.

To such conventional inks, it is common to add urea, urea derivatives, thiourea or thiourea derivatives as humectants (Japanese Patent Applications Laid-open No. 57-74372, No. 56-4488, No. 3-234775, No. 4-85375 and No. 4-332777). Such urea, urea derivatives, thiourea and thiourea derivatives improve solubility of dyes in various solvents and hence are used as dissolving aids (Japanese Patent Application Laid-open No. 2-173168). They are also effective for increasing ejection quantity and improving ejection performance (Japanese Patent Applications Laid-open No. 1-203483, No. 62-1765, No. 62-74973 and No. 56-88473, and Japanese Patent Publications No. 57-31759, No. 60-42834 and No. 1-6236), and acting as pH maintainers to improve storage stability (Japanese Patent Applications Laid-open No. 1-203483, No. 62-1765, No. 62-74973 and No. 56-88473, and Japanese Patent Publications No. 57-31759 and No. 1-6236.

Many of dyes, however, cause agglomeration due to ammonium ions generated as a result of decomposition of urea, so that a precipitate due to the agglomeration of dyes may be produced when inks to which urea has been added are stored for a long period of time, bringing about the problem of clogging that occurs at ink ejection outlets or ink feed pipes of ink-jet recording apparatus. In the case of inks containing a pigment, the ammonium ions generated as a result of decomposition of the urea and a dispersing agent for the pigment chemically react to cause agglomeration of the pigment, so that ink ejection outlets or ink feed pipes of ink-jet recording apparatus may clog. In addition, without regard to the types of colorants, ammonia generated by decomposition attacks metallic members or the odor of ammonia gives users an unpleasant feeling. Recently, mainly in the case of slightly water-soluble dyes, it has been also found that the addition of urea promotes a phenomenon in which printing carried out on a strongly acidic paper of about pH 4 (pH measured according to JIS-P8133) results in an increase in gloss of print characters and black has a look of gold because of the reflection of light (i.e, the bronze phenomenon or bronzing).

On account of such problems, studies have been made on ink formulation concerned with the addition of urea, where studies are made on, e.g., the improvement of moisture retention by greatly increasing the amount of a solvent (a polar solvent with a high boiling point) added, the addition of an alcohol amine as a pH maintainer, the addition of a p-toluenesulfonamide ethylene oxide addition product as a dye dissolving aid, and the prevention of agglomeration by increasing the proportion of a dispersing agent to a pigment when an ink containing a pigment is used.

However, the use of a polar solvent in a large amount, the addition of an alcohol amine or a p-toluenesulfonamide ethylene oxide addition product and the increasing of the proportion of a dispersing agent to a pigment have involved the following problems.

The addition of a polar solvent in a large amount results in a small contact angle between ink and a recording medium to cause feathering or results in a decrease in OD (optical density) to make print quality extremely poor. It also results in an increase in the viscosity of ink to make ejection performance poor.

The addition of a p-toluenesulfonamide ethylene oxide addition product is effective against the bronze phenomenon. However, like the addition of a polar solvent in a large amount, it results in a small contact angle between ink and a recording medium to cause feathering or results in a decrease in OD (optical density) to make print quality extremely poor. It also causes bubbles in ink to make recording performance poor.

The addition of an alcoholamine typified by triethanolamine, diethanolamine or monoethanolamine eliminates the problem of agglomeration of dyes or pigments during the storage of ink and the problem of the bronze phenomenon. However, because of their strong basicity, the pH of ink increases to as much as 11 to 12 even when added in an amount of about 5% by weight, so that components of various members coming into liquid-contact with ink may dissolve out of the members to cause changes in ink properties, resulting in ejection failure or ink leakage. This also results in a lowering of ink placement precision to make print quality poor. Many black dyes give a very poor tone which leads to a lowering of image quality in a multi-color print. Besides, amines are disadvantageous in that their peculiar odor gives users an unpleasant feeling.

When an ink containing a pigment is used, the viscosity of ink increases with an increase in the proportion of a dispersing agent to a pigment, and hence the sedimentation velocity decreases according to the Stokes' equation of sedimentation velocity and also the agglomeration becomes slow. Thus the problem of precipitates due to the agglomeration of pigments has been overcome. Since, however, the viscosity of ink increases, the ejection performance of ink becomes poor. In particular, in the case of ink-jet recording in which recording is carried out by ejecting ink droplets by the action of heat energy, there has been another problem in that an increase in the concentration of organic matter in the ink results in an adhesion of thermally decomposed organic matter to a heating member to prohibiting liquid droplets from bubbling.

In the meantime, though not concerned with inks for ink-jet recording, Japanese Patent Publication No. 61-55552 discloses a recording ink for writing implements which contains a humectant and a specific urea compound serving as a dissolving aid. However, compared with .inks for writing implements such as fountain pens and felt pens commonly available, inks for ink-jet recording have more strict requirements on many performances such that uniform ink droplets must be stably ejected from minute ejection orifices over a long period or short period of time. Thus, when the above specific urea compound is added in an ink with a high pH and the resulting ink is applied to ink-jet recording, no good ejection can be achieved, accompanied with ejection failure and so forth. In particular, in the ink-jet recording process making use of heat energy, this phenomenon remarkably occurs, having a great influence on printing as exemplified by image distortion due to a decrease in ejection velocity or a lowering of print density due to a decrease in ejection quantity.

SUMMARY OF THE INVENTION

Accordingly, an object of the present invention is to provide i) an ink having a superior long-term storage stability while keeping a good moisture retention, an ejection stability, a high dye-dissolving performance and a pH maintenance power that are comparable to those of inks conventionally used in ink-jet recording and to which any of urea or thiourea and derivatives thereof is added, and also can be free from precipitates caused by agglomeration of dyes or pigments, ii) an ink-jet recording process making use of the ink and iii) equipment making use of such an ink.

Another object of the present invention is to provide i) an ink that may cause neither the bronze phenomenon nor feathering, can give an ideal black tone when a black ink is used and can obtain sharp and good images with a high density, ii) an ink-jet recording process making use of the ink and iii) equipment making use of such an ink.

The above objects can be achieved by the invention described below.

The present invention provides an ink containing a recording agent and a liquid medium capable of dissolving or dispersing the recording agent, wherein said ink comprises a compound represented by the formula $$R_1R_2NCONHCH_2CH_2OH$$

wherein $R_1$ and $R_2$ each represent hydrogen or $C_nH_{2n}OH$, where n is 2 or 3, provided that $R_1$ and $R_2$ are not hydrogen at the same time, and has a pH of not less than 7 to less than 10.

The present invention also provides an image forming process comprising causing an ink to adhere to a recording medium to form an image, wherein said ink comprises a recording agent, a liquid medium capable of dissolving or dispersing the recording agent, and a compound represented by the formula $$R_1R_2NCONHCH_2CH_2OH$$

wherein $R_1$ and $R_2$ each represent hydrogen or $C_nH_{2n}OH$, where n is 2 or 3, provided that $R_1$ and $R_2$ are not hydrogen at the same time, and has a pH of not less than 7 to less than 10.

The present invention also provides an ink-jet recording process comprising ejecting an ink in the form of ink droplets to perform recording, wherein said ink comprises a recording agent, a liquid medium capable of dissolving or dispersing the recording agent, and a compound represented by the formula $$R_1R_2NCONHCH_2CH_2OH$$

wherein $R_1$ and $R_2$ each represent hydrogen or $C_nH_{2n}OH$, where n is 2 or 3, provided that $R_1$ and $R_2$ are not hydrogen at the same time, and has a pH of not less than 7 to less than 10.

The present invention still also provides an ink-jet recording unit comprising an ink holder that holds an ink, and a head assembly for ejecting the ink in the form of ink droplets, wherein said ink is the ink described above.

The present invention still further provides an ink cartridge comprising an ink holder that holds an ink, wherein said ink is the ink described above.

The present invention still further provides an ink-jet recording apparatus comprising a recording unit comprising an ink holder that holds an ink, and a head assembly for ejecting the ink in the form of ink droplets, wherein said ink is the ink described above.

The present invention still further provides an ink-jet recording apparatus comprising an ink cartridge comprising an ink holder that holds an ink, and a recording head for ejecting the ink in the form of ink droplets, wherein said ink is the ink described above.

DESCRIPTION OF THE PREFERRED EMBODIMENTS

Figure 1:
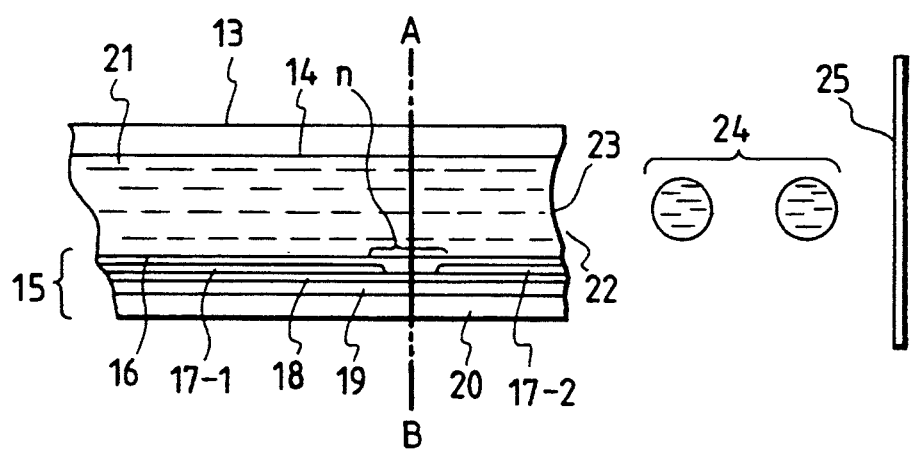
FIG. 1 illustrates a transverse cross section of a head assembly of an ink-jet recording apparatus.

In inks for ink-jet recording, the present inventors have developed an ink that simultaneously satisfies the above various required performances. As a result, the inventors have discovered that, as greatly superior characteristics neither the bronze phenomenon nor feathering occur, and good moisture retention and ejection stability can be achieved when the ink contains a urea derivative represented by the above formula and pH is controlled to a value ranging from 7 to 10.

In particular, the invention is remarkably effective when a pigment is used.

The present inventors have also discovered that the solubility of the urea derivative can be improved and long-term storage stability and ejection performance can be further improved when the ink contains 2-oxo-oxazolidine together with the urea derivative represented by the above formula, and thus have accomplished the present invention.

In particular, the invention is remarkably effective when any one of $R_1$ and $R_2$ is H.

The urea derivative that mainly characterizes the present invention is represented by the formula $$R_1R_2NCONHCH_2CH_2OH$$

wherein $R_1$ and $R_2$ each represent hydrogen or $C_nH_{2n}OH$, where n is 2 or 3, provided that $R_1$ and $R_2$ are not hydrogen at the same time.

Stated specifically, the urea derivatives include those in which;

$R_1$ is H and $R_2$ is $CH_2CH_2OH$;
$R_1$ is $CH_2CH_2OH$ and $R_2$ is $CH_2CH_2OH$;
$R_1$ is H and $R_2$ is $CH_2CH_2CH_2OH$; and
$R_1$ is $CH_2CH_2CH_2OH$ and $R_2$ is $CH_2CH_2CH_2OH$.

Of these, 1,3-bis($\beta$-hydroxyethyl)urea is particularly preferred.

The urea derivative of the present invention, represented by the above formula, has a structure similar to urea and has in the molecule two or three hydroxyl groups (—OH) having a strong affinity for water. Hence, its moisture retention can be much larger than urea compounds otherwise having a good moisture retention. Also an alkanolamine is produced by hydrolysis, but at a rate lower than urea. The alkanolamine produced has a good compatibility with water and other solvents, and also acts as a dissolving aid on direct dyes. It also has a high boiling point and can only be evaporated with difficulty. Hence, it is considered that the ejection failure due to agglomeration of dyes or pigments or dry-up of ink may very seldom occur and a superior moisture retention and so forth can be achieved.

The bronze phenomenon can also be prevented since the compound hardly releases water.

The urea derivative represented by the above formula may preferably be contained in the ink in an amount ranging from 0.1 to 10% by weight, and more preferably from 1 to 10% by weight, which may vary depending on the quantity and type of a colorant or recording methods. Its use in an amount less than 0.1% by weight can be ineffective for preventing the ink from being solidified at nozzle tips. On the other hand, its use in an amount more than 10% by weight may result in a poor ejection performance.

A method for synthesizing the urea derivative of the present invention, represented by the above formula, will be described below. The urea derivative of the present invention may be considered from its structure to be synthesized by addition of ethylene oxide to urea. In practice, however, it can not be synthesized by such a method. This is because the ethylene oxide is usually gaseous and on the other hand the urea is solid, and hence the urea must be melted or formed into a solution before the synthesis is carried out. Nevertheless, urea is thermally decomposable and hence not suited for melting. In addition, in a polar solvent capable of dissolving urea, as exemplified by water, glycerol or ethylene glycol that imparts protons, urea reacts with the polar solvent before its addition reaction with ethylene oxide, upon heating for carrying out the addition reaction. On the other hand, a non-protonic polar solvent such as N-methylpyrrolidone or dimethyl formamide does not dissolve urea. Thus, the synthesis by addition reaction of ethylene oxide to urea is not ordinary. In the present invention, according to the disclosure in Japanese Patent Publication No. 49-33933, 2-oxo-oxazolidine and a monoethanolamine such as monopropanolamine, diethanolamine or dipropanolamine are mixed, and the mixture is heated in an oil bath of 120° to 130° C. for 20 minutes, followed by cooling to effect solidification and then crystallization using acetone to yield 1,3-bis($\beta$-hydroxyethyl)urea, 1-$\gamma$-hydroxypropyl-3-($\beta$-hydroxyethyl)urea, 1,1-bis-($\beta$-hydroxyethyl)-3-($\beta$-hydroxyethyl)urea or 1,1-bis-($\gamma$-hydroxypropyl)-3-($\beta$-hydroxyethyl)urea.

The ink of the present invention must be controlled to have a pH ranging between 7 and 10. An ink with a pH of less than 7 is not preferable since it may cause clogging or an abrupt lowering of ejection performance. An ink with a pH of 10 or more is also not preferable since it may cause a lowering of ejection performance or cause corrosion of members coming into liquid-contact with the ink. The pH can be adjusted by known methods, e.g., by controlling the type or content of a colorant or liquid medium and the content of the urea derivative of the present invention and adding a buffer.

The ink of the present invention contains a colorant (a recording agent) and a liquid medium capable of dissolving or dispersing the colorant.

There are no particular limitations on the colorant in the present invention.

As dyes, phthalocyanine type, xanthene type, triphenylmethane type, anthraquinone type, monoazo type, disazo type, trisazo type and tetraazo type dyes are preferable, which are used in writing implements and ink-jet recording apparatus. In particular, as azo dyes for black, dyes having a structure of the following formula I or II are preferable.

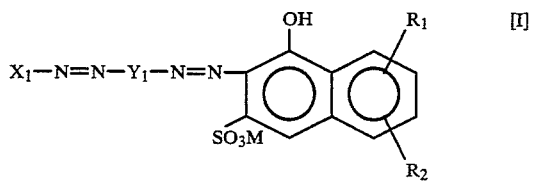

wherein $X_1$ represents

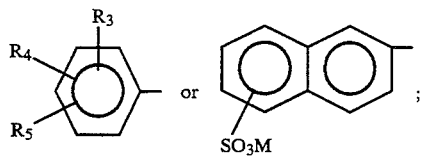

$Y_1$ represents

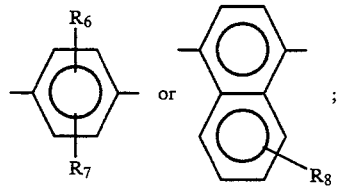

and $R_1$ and $R_2$ each represent —H, —NH$_2$,

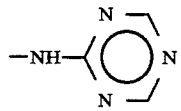

or —SO$_3$M; $R_3$, $R_4$ and $R_5$ each represent —H, —SO$_3$H, —SO$_3$M, —COOH, —COOM, —OH, —NH$_2$ or —NH$_2$ or

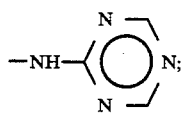

$R_6$ and $R_7$ each represent —H, —OCH$_3$, —CH$_3$, —NH$_2$ or —NHCOCH$_3$; and $R_8$ represent —H, —SO$_3$H or —SO$_3$M, where M represents an alkali metal atom, ammonium or an amine.

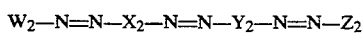

wherein $W_2$ represents

X₂ represents

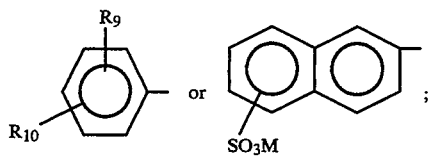

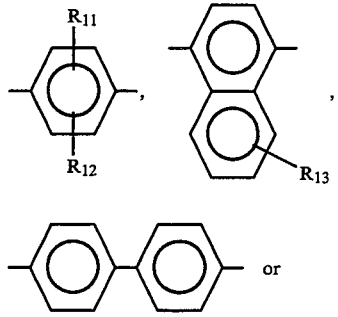

Y₂ represents

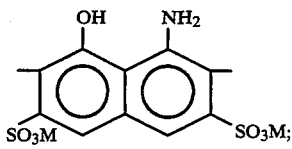

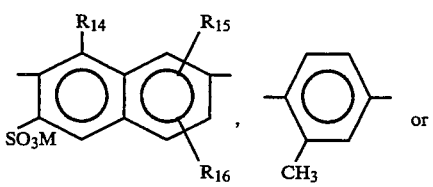

Z₂ represents

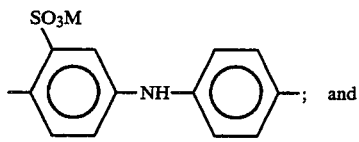

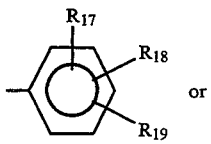

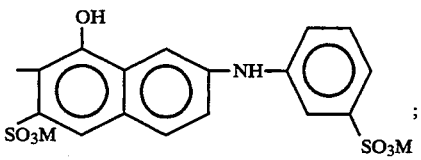

$R_9$ and $R_{10}$ each represent —H, —Cl, —NH₂, —CH₃, —SO₃M, —NHCOCH₃ or —NHCONH₂; $R_{11}$ and $R_{12}$ each represent —H or OCH₃; $R_{13}$ represents —H or —SO₃M; $R_{14}$, $R_{15}$ and $R_{16}$ each represent —H, —OH, —SO₃M or —NH₂; $R_{17}$, $R_{18}$ and $R_{19}$ each represent —H, —OH, —NH₂, —SO₃H, —SO₃M, —OCH₃ or —NHCONH₂, where M represents an alkali metal atom, ammonium or an amine.

Stated specifically, dyes having the structures shown below are preferred. The content of any of these dyes in the ink may vary depending on recording methods. In usual instances, the dye should preferably be used in an amount of not more than 10% by weight, and more preferably not more than 6% by weight, based on the total weight of the ink.

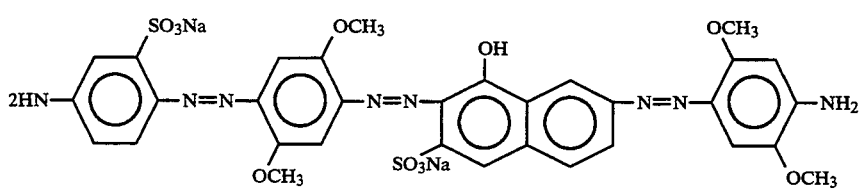
No. 1

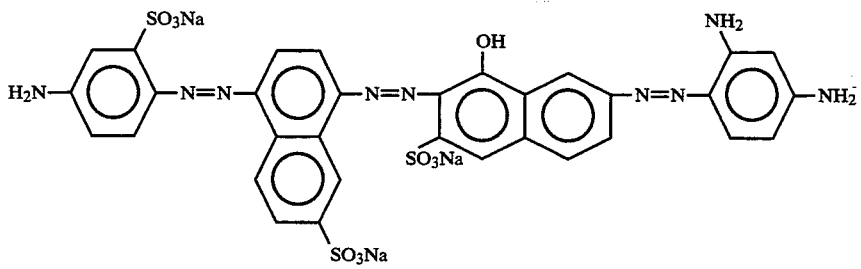
No. 2

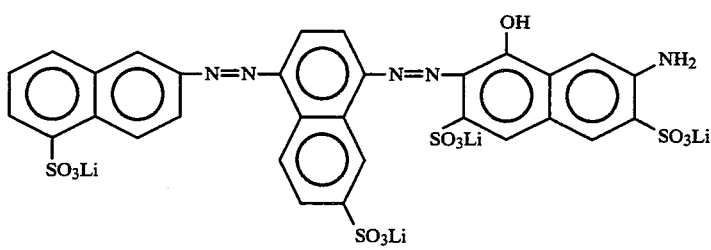
No. 3

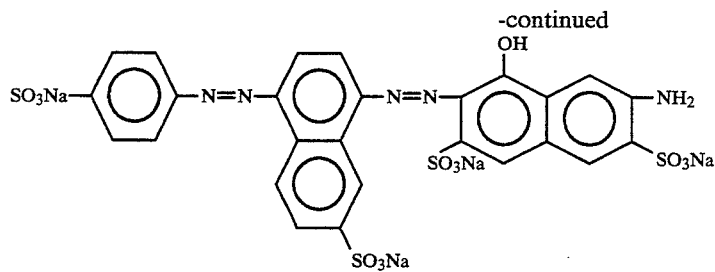
No. 4
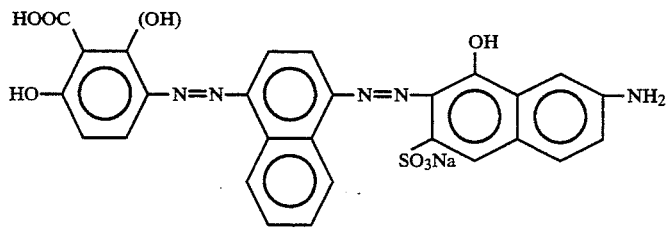
No. 5
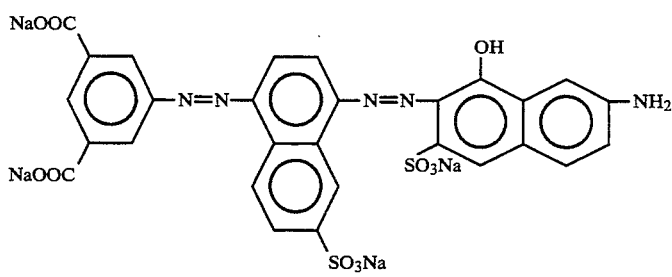
No. 6
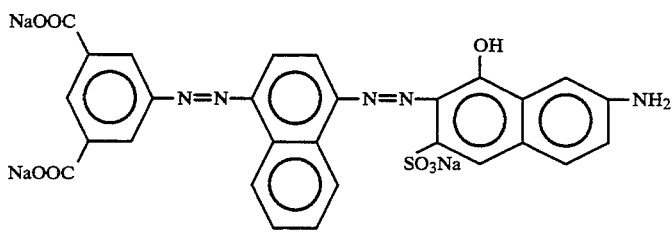
No. 7
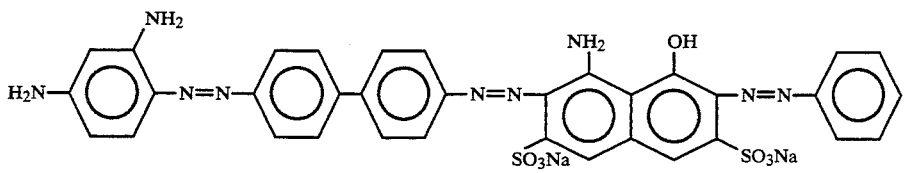
No. 8
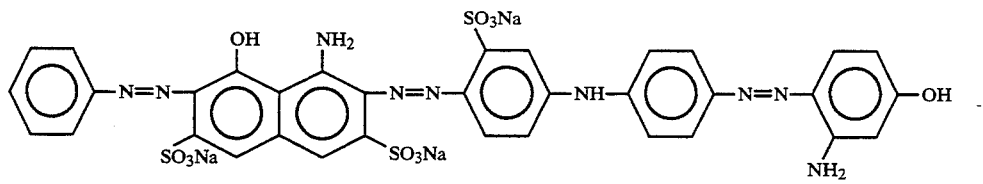
No. 9
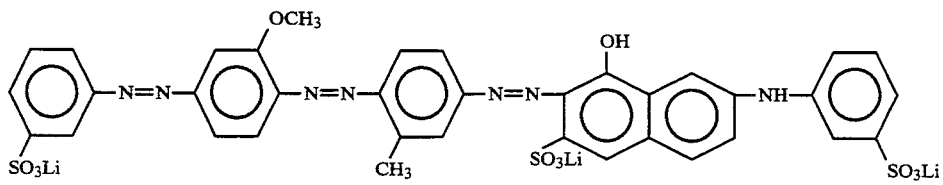
No. 10
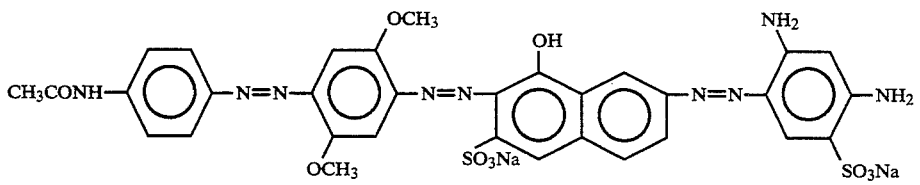
No. 11

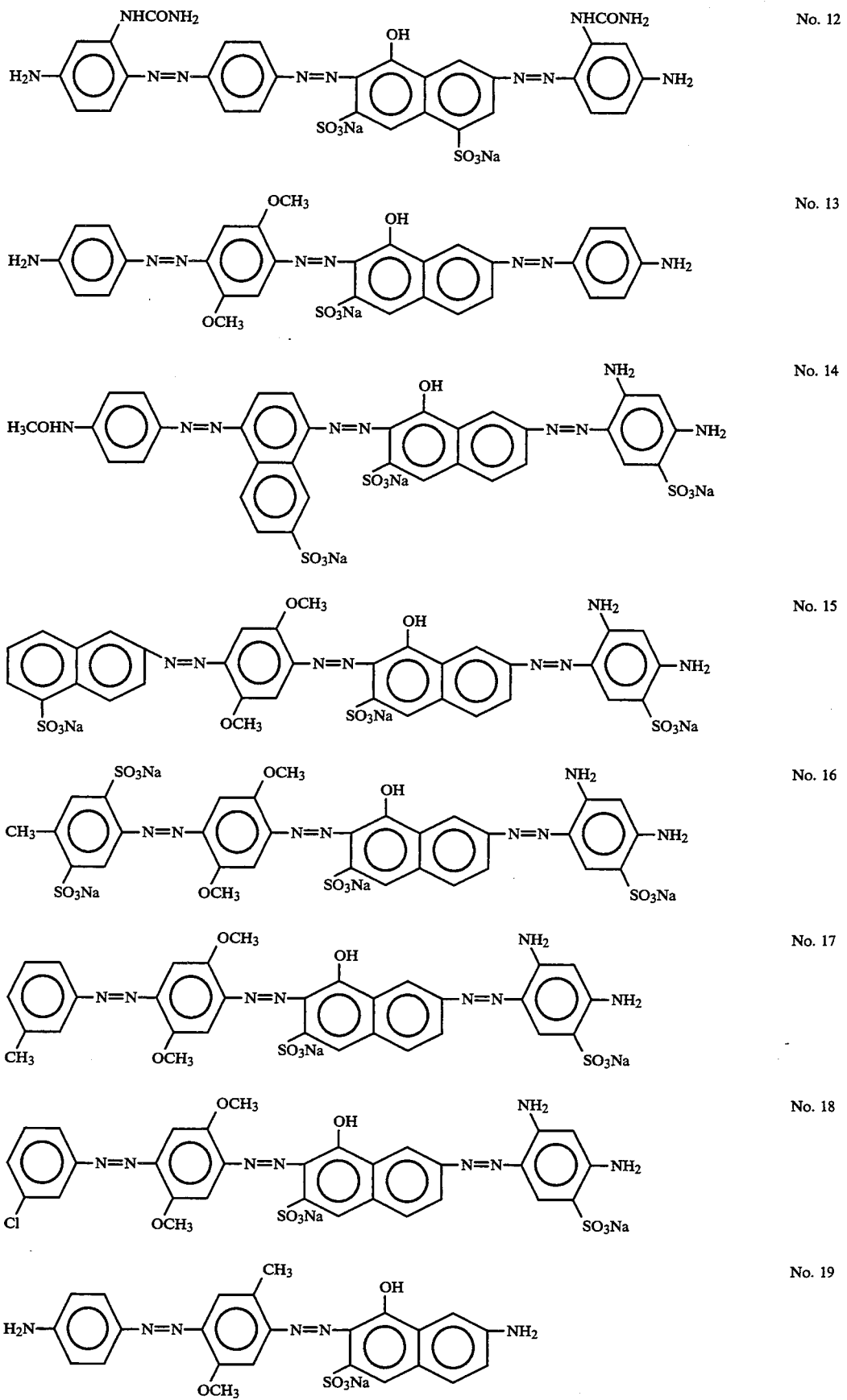

-continued

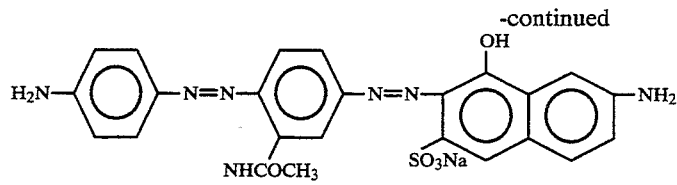

No. 20

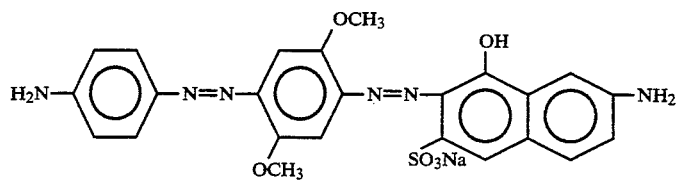

No. 21

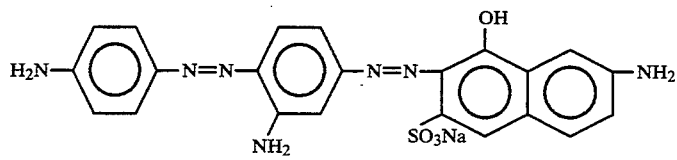

No. 22

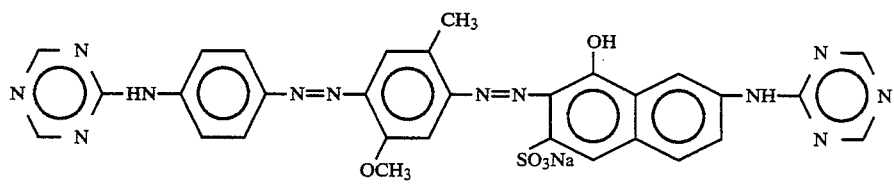

No. 23

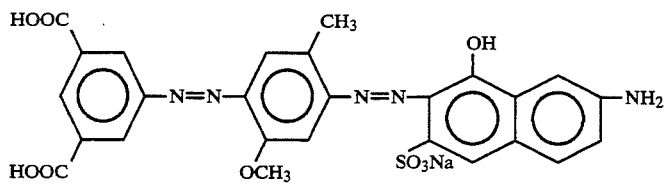

No. 24

As pigments, it is possible to use black pigments including carbon black No. 2300, No. 900, MCF88, No. 33, No. 40, No, 45, No. 52, MA7, MA8 and #2200B (all available from Mitsubishi Chemical Industries Limited.), RAVEN1255 (available from Columbian Carbon Japan Limited), REGAL330R, REGAL660R and MOGUL L (available from CABOT Corp.), Color Black FW18, Color Black S170, Color Black S150, Printex 35 and Printex U (available from Degussa Japan Co., Ltd.), and also those anew prepared for the present purpose. The content of any of these pigments in the ink may vary depending on recording methods. In usual instances, the dye should preferably be used in an amount of from 3 to 12% by weight, and more preferably from 3 to 7% by weight, based on the total weight of the ink.

A dispersing agent used when the pigment is used as the colorant may include a styrene/acrylic acid copolymer, a styrene/acrylic acid/alkyl acrylate copolymer, a styrene/maleic acid copolymer, a styrene/maleic acid-/alkyl acrylate copolymer, a styrene/methacrylic acid copolymer, a styrene/methacrylic acid/alkyl acrylate copolymer, a styrene/maleic acid half ester copolymer, a vinylnaphthalene/acrylic acid copolymer and a vinylnaphthalene/maleic acid copolymer, or salts of these. Any of these dispersing agent may preferably be contained in an amount ranging from 0.3 to 2% by weight based on the total weight of the ink.

The ink of the present invention may preferably contain as liquid medium components the following humectant, dissolving aid and dispersion stabilizer in addition to water, including alkylene glycols whose alkylene group contains 2 to 6 carbon atoms, such as ethylene glycol, diethylene glycol, triethylene glycol, thiodiglycol, 1,2,6-hexanetriol and propylene glycol; polyalkylene glycols such as polyethylene glycol and polypropylene glycol; alcohol amines such as monoethanol amine, diethanol amine and triethanol amine; non-proton-donative polar solvents such as dimethylformamide, dimethylacetamide, dimethyl sulfoxide and sulfolane; lower alkyl ethers of polyhydric alcohols, such as ethylene glycol monomethyl or -ethyl ether, diethylene glycol monomethyl or -ethyl ether, and triethylene glycol monomethyl or -ethyl ether; glycerol, formamide, 2-pyrrolidone, N-methylpyrrolidone, and sorbitol. These may be contained in the ink preferably in an amount ranging from 5 to 60% by weight based on the total weight of the ink.

When the ink of the present invention is used in ink-jet recording, an alkyl alcohol such as methanol, ethanol, propanol or butanol may be incorporated. This can bring about a more improvement in ejection performance and can be further effective. Any of these alkyl alcohol may preferably be contained in an amount of from 3 to 10% by weight based on the total weight of the ink.

In addition to the above components, the ink of the present invention may further contain 2-oxo-oxazolidine.

In the present invention, the 2-oxo-oxazolidine may preferably be contained in an amount of from 0.5 to 30% in weight ratio based on the urea derivative represented by the above formula of the present invention.

Its use in an amount less than 0.5% can not have the effect of the 2-oxo-oxazolidine, and its use in an amount more than 30% may adversely result in a poor ejection performance.

The ink of the present invention may optionally contain a buffer. The buffer that may be required may be those known in the art, including acetic acid/an acetate, citric acid/a citrate, succinic acid/a succinate, boric acid/a borate and phosphoric acid/a phosphate.

The ink may further optionally contain various additives such as a surface active agent, a rust-proofing agent, an antiseptic, an antifungal agent, an antioxidant and a water-soluble polymer.

The recording process of the present invention is a recording process .characterized by the use of the ink described above, and particularly preferably applied to ink-jet recording. Needless to say, the recording process can also be applied to usual writing implements. Of the ink-jet recording, the process can be particularly preferably applied to an ink-jet recording process of the type wherein ink is ejected by bubbling utilizing a heat energy.

The ink of the present invention enables good recording with an ideal tone even on usual plain paper, i.e., a recording medium having a recording surface to which fibers are exposed.

The ink of the present invention can be particularly preferably used in the ink-jet recording in which recording is carried out by ejecting ink droplets by the action of heat energy. Needless to say, it can also be used for usual writing implements.

The apparatus suited to carry out recording by the use of the ink of the present invention may include an apparatus in which a heat energy corresponding with a recording signal is imparted to the ink held in the interior of a recording head so that ink droplets are generated by the action of the heat energy.

Figure 2:
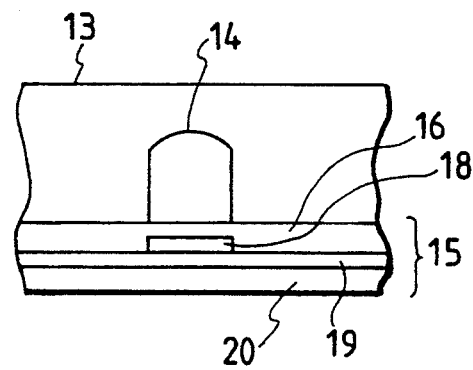
FIG. 2 illustrates a vertical cross section of a head assembly of an ink-jet recording apparatus.
Figure 3:
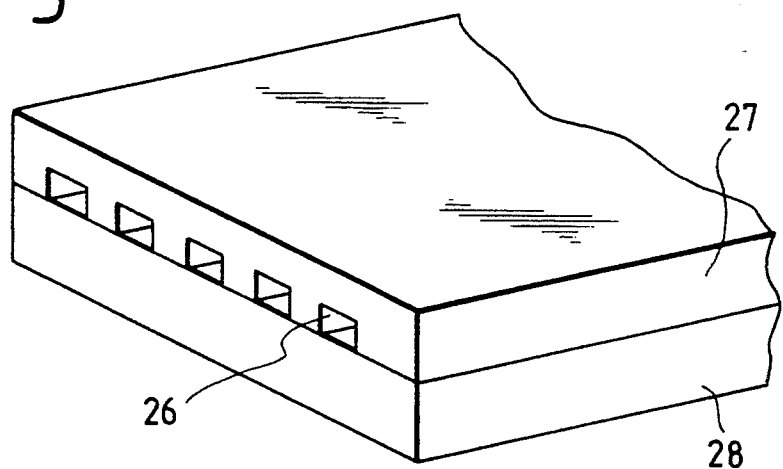
FIG. 3 is a perspective illustration of a multiple head comprising the head as shown in FIGS. 1 and 2.

FIGS. 1, 2 and 3 show examples of the construction of the head, which is a main component of the apparatus.

A head 13 is formed by bonding a glass, ceramic or plastic plate or the like having a channel 14 through which ink is passed, to a heating head 15 used in thermal recording (the drawing shows a head, to which, however, is not limited). The heating head 15 is comprised of a protective film 16 formed of silicon oxide or the like, aluminum electrodes 17-1 and 17-2, a heating resistor layer 18 formed of nichrome or the like, a heat accumulating layer 19, and a substrate 20 with good heat dissipation properties.

The ink 21 reaches an ejection orifice (a minute opening) 22 and a meniscus 23 is formed there by a pressure (not shown).

Now, upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of recording minute drops 24 to fly against a recording medium 25. FIG. 3 illustrates the appearance of a multi-head comprising the head as shown in FIG. 1 arranged in a large number. The multi-head is prepared by closely adhering a glass plate 27 having a multi-channel 26, to a heating head 28 similar to the head as illustrated in FIG. 1.

FIG. 1 is a cross-sectional view of the head 13 along its ink flow path, and FIG. 2 is a cross-sectional view along the ling A-B in FIG. 1.

Figure 4:
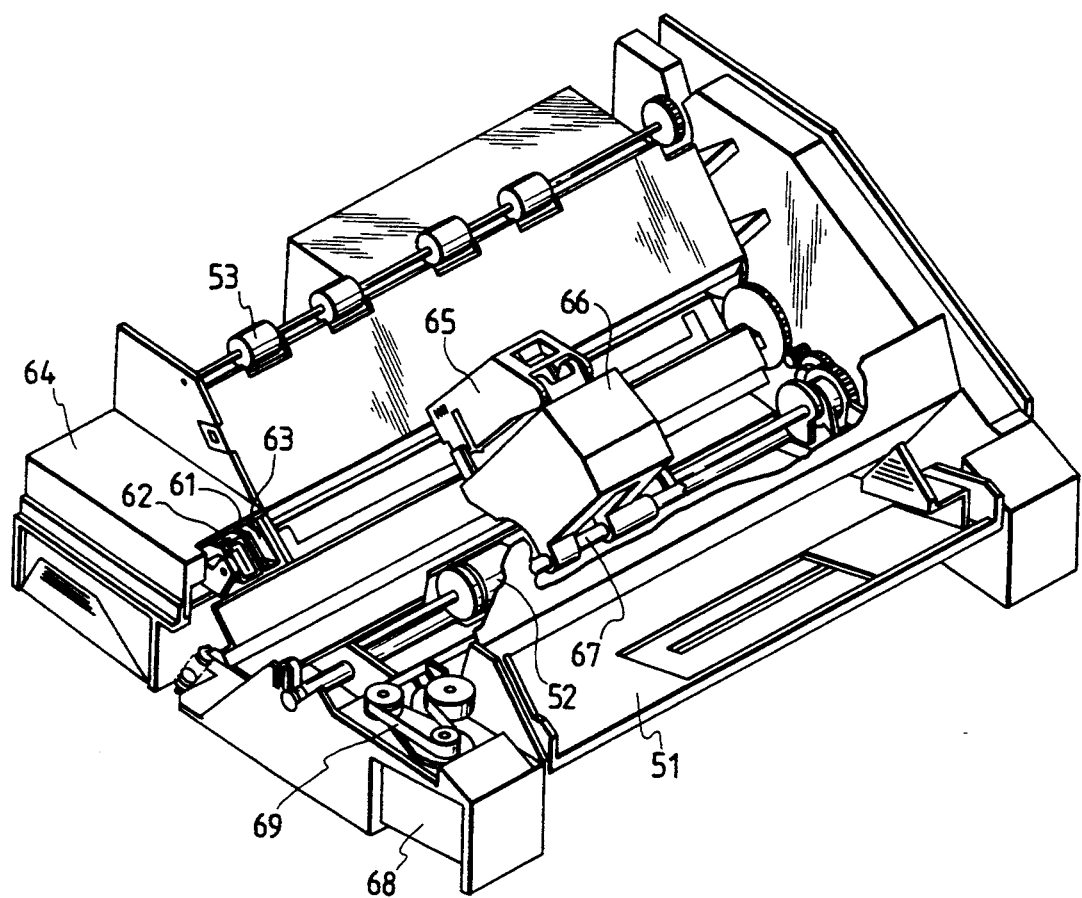
FIG. 4 is a perspective illustration of an example of an ink-jet recording apparatus.

FIG. 4 shows an example of an ink-jet recording apparatus in which such a head has been incorporated.

In FIG. 4, reference numeral 61 denotes a blade serving as a wiping member in the form of a cantilever, one end of which is a stationary end retained by a blade-retaining member. The blade 61 is provided at the position adjacent to the region in which a recording head makes a record. In the present example, the blade is retained in such a form that it projects to the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorber provided adjoiningly to the blade 61, and, similar to the blade 61, is retained in such a form that it projects into the course through which the recording head is moved. The above blade 61, cap 62 and absorber 63 constitute an ejection restoration assembly 64, where the blade 61 and the absorber 63 remove the water, dust or the like from the ink ejection opening face.

Reference numeral 65 denotes the recording head having an ejection energy generating means and ejects ink to the recording medium set opposingly to the ejection opening face provided with ejection openings, to carry out recording. Reference numeral 66 denotes a carriage on which the recording head 65 is mounted so that the recording head 65 can be moved. The carriage 66 is slidably associated with a guide shaft 67. A part of the carriage 66 is connected (not shown) with a belt 69 driven by a motor 68. Thus, the carriage 66 can be moved along the guide 67 and hence the recording head 65 can be moved from a recording region to a region adjacent thereto.

Reference numeral 51 denotes a paper feeding part from which recording mediums are inserted, and 52, a paper feed roller driven by a motor (not shown). With such construction, the recording medium is fed to the position opposing to the ejection opening face of the recording head, and, with progress of recording, outputted from a paper output section provided with a paper output roller.

In the above constitution, the cap 62 of the head restoration assembly 64 is receded from the moving course of the recording head 65 when the recording head 65 is returned to its home position; e.g., after completion of recording, and the blade 61 stands projected into the moving course. As a result, the ejection opening face of the recording head 65 is wiped. When the cap 62 comes into contact with the ejection opening face of the recording head 65 to carry out capping, the cap 62 is moved in such a way that it projects into the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 5:
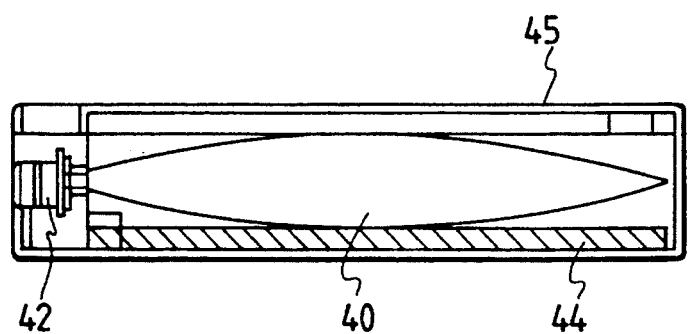
FIG. 5 is a vertical cross-sectional illustration of an ink cartridge.

FIG. 5 shows an example of an ink cartridge, denoted as 45, that has held the ink being fed to the head through an ink-feeding member as exemplified by a tube. Herein reference numeral 40 denotes an ink holder that has held the feeding ink, RS exemplified by an ink bag. The top thereof is provided with a stopper 42 made of rubber. A needle (not shown) may be inserted to this stopper 42 so that the ink in the ink holder 40 can be fed to the head. Reference numeral 44 denotes an absorber that receives a waste ink. It is preferred in the present invention that the ink holder is formed of a polyolefin, in particular, polyethylene, at its surface with which the ink comes into contact.

Figure 6:
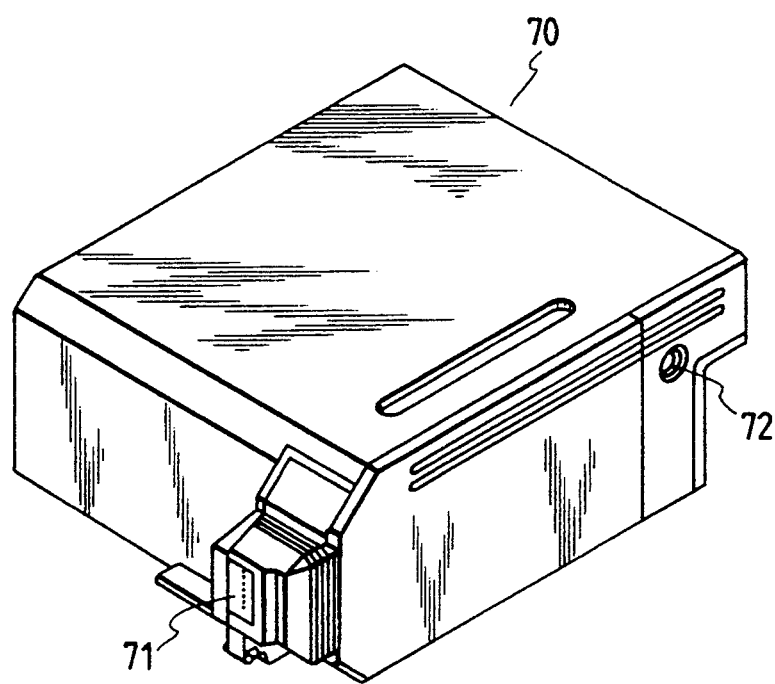
FIG. 6 is a perspective illustration of an ink-jet cartridge (or recording unit)

The ink-jet recording apparatus used in the present invention is not limited to the apparatus as described above in which the head and the ink cartridge are separately provided, and a device can also be preferably used in which these are integrally formed as shown in FIG. 6.

In FIG. 6, reference numeral 70 denotes a recording unit, in the interior of which an ink holder that has held an ink, as exemplified by an ink absorber, is contained. The recording unit is so constructed that the ink in such an ink absorber is ejected in the form of ink droplets from a head 71 having a plurality of orifices. As a material for the ink absorber, it is preferred in the present invention to use polyurethane.

Reference numeral 72 denotes an air path opening through which the interior of the cartridge is made to communicate with the atmosphere.

This recording unit 70 can be used in place of the recording head shown in FIG. 4, and is detachably mounted to the carriage 66.

EXAMPLES

The present invention will be described below by giving Examples and Comparative Examples. In the following, "part(s)" indicates "part(s) by weight" unless particularly noted.

Examples 1 to 10 & Comparative Examples 1 to 3

According to the following formulation, all the components were mixed and stirred. Thereafter the pH was measured and the pH was adjusted as occasion calls. Inks were thus prepared. The pH of each ink and results of evaluation are shown in Table 1.

| (Example 1) | |
|---|---|
| Dye No. 1 | 3 parts |
| Diethylene glycol | 10 parts |
| Isopropyl alcohol | 3 parts |
| 1,3-Bis(β-hydroxyethyl)urea | 5 parts |
| Ion-exchanged water | 79 parts |
| The pH was adjusted using a citric acid/sodium citrate (1:9) solution. | |

| (Example 2) | |
|---|---|
| Dye No. 1 | 3 parts |
| Diethylene glycol | 10 parts |
| Isopropyl alcohol | 3 parts |
| 1-Mono-γ-hydroxypropyl-3-mono-(β-hydroxyethyl)urea | 5 parts |
| Ion-exchanged water | 79 parts |
| The pH was adjusted using a citric acid/sodium citrate (1:9) solution. | |

| (Example 3) | |
|---|---|
| Dye No. 1 | 3 parts |
| Diethylene glycol | 10 parts |
| Isopropyl alcohol | 3 parts |
| 1,3-Bis-(β-hydroxyethyl)urea | 1 part |
| 2-Oxo-oxazolidine | 0.005 part |
| Ion-exchanged water | 83 parts |
| The pH was adjusted using a citric acid/sodium citrate (1:9) solution. | |

| (Example 4) | |
|---|---|
| Dye No. 6 | 3 parts |
| 2-Pyrrolidone | 10 parts |
| Isopropyl alcohol | 3 parts |
| 1,3-Bis-(β-hydroxyethyl)urea | 10 parts |
| 2-Oxo-oxazolidine | 3 parts |
| Ion-exchanged water | 71 parts |
| The pH was adjusted using a citric acid/sodium citrate (1:9) solution. | |

| (Example 5) | |
|---|---|
| Dye No. 7 | 3 parts |
| Triethylene glycol | 10 parts |
| Isopropyl alcohol | 3 parts |
| 1,3-Bis-(β-hydroxyethyl)urea | 3 parts |
| 2-Oxo-oxazolidine | 0.3 part |
| Ion-exchanged water | 80.7 parts |
| The pH was adjusted using a citric acid/sodium citrate (1:9) solution. | |

| (Example 6) | |
|---|---|
| Dye No. 5 | 3 parts |
| Polyethylene glycol 300 | 5 parts |
| N-methyl pyrrolidone | 5 parts |
| Isopropyl alcohol | 3 parts |
| 1,3-Bis-(β-hydroxyethyl)urea | 4 parts |
| 2-Oxo-oxazolidine | 0.4 part |
| Ion-exchanged water | 79.6 parts |
| The pH was adjusted using a citric acid/sodium citrate (1:9) solution. | |

| (Example 7) | |
|---|---|
| Dye No. 1 | 3 parts |
| Glycerol | 5 parts |
| Dimethyl sulfoxide | 5 parts |
| Isopropyl alcohol | 3 parts |
| 1,3-Bis-(β-hydroxyethyl)urea | 3 parts |
| 2-Oxo-oxazolidine | 0.3 part |
| 10% Surfynol (trade mark; nonionic surface active agent available from Airco Chemicals and Plastics) | 1 part |
| Ion-exchanged water | 79.7 parts |
| The pH was adjusted using a citric acid/sodium citrate (1:9) solution. | |

| (Example 8) | |
|---|---|
| Dye No. 18 | 3 parts |
| Ethylene glycol | 5 parts |
| Dimethylformamide | 5 parts |
| Isopropyl alcohol | 3 parts |
| 1-Mono-γ-hydroxypropyl-3-mono-(β-hydroxyethyl)urea | 5 parts |
| 2-Oxo-oxazolidine | 1.5 parts |
| Ion-exchanged water | 77.5 parts |
| The pH as adjusted using a citric acid/sodium citrate (1:9) solution. | |

| (Example 9) | |
|---|---|
| Dye No. 1 | 3 parts |
| Diethylene glycol | 10 parts |
| Isopropyl alcohol | 3 parts |
| 1-Mono-β-hydroxyethyl-3,3-bis-(β-hydroxyethyl)urea | 5 parts |
| 2-Oxo-oxazolidine | 0.5 part |
| Ion-exchanged water | 78.5 parts |
| The pH was adjusted using a citric acid/sodium citrate (1:9) solution. | |

| (Example 10) | |
|---|---|
| Dye No. 6 | 3 parts |
| 2-Pyrrolidone | 10 parts |
| Isopropyl alcohol | 3 parts |
| 1-Mono-β-hydroxyethyl-3,3-bis-(γ-hydroxypropyl)urea | 5 parts |
| 2-Oxo-oxazolidine | 0.5 part |
| Ion-exchanged water | 78.5 parts |
| The pH was adjusted using a citric acid/sodium | |

-continued citrate (1:9) solution.

(Comparative Example 1)

| | |
|---|---|
| Dye No. 1 | 3 parts |
| Diethylene glycol | 10 parts |
| Isopropyl alcohol | 3 parts |
| Urea | 5 parts |
| Ion-exchanged water | 79 parts |

(Comparative Example 2)

| | |
|---|---|
| Dye No. 4 | 10 parts |
| Ethylene glycol | 10 parts |
| Thiodiethylene glycol | 5 parts |
| Isopropyl alcohol | 3 parts |
| 1,3-bis-(β-hydroxyethyl)urea | 10 parts |
| 10% Surfy-nol solution | 1 part |
| Ion-exchanged water | 61 parts |

(Comparative Example 3)

| | |
|---|---|
| Dye No. 1 | 3 parts |
| Diethylene glycol | 10 parts |
| Isopropyl alcohol | 3 parts |
| 1,3-bis-(β-hydroxyethyl)urea | 5 parts |
| Ion-exchanged water | 79 parts |

The pH was adjusted using a citric acid/sodium citrate (1:9) solution.

Evaluation method

Occurrence of bronzing

Visually evaluated by 20 persons for men and women each to examine whether or not print characters are glossy due to reflection of light. Printing was carried out using an ink-jet printer (trade name: BJ130, manufactured by Canon Inc.).

0 point: Person who notes bronzing
1 point: Person who notes no bronzing

Storage stability 100 ml of ink was put in a 100 ml glass bottle produced by Shot Co. The bottle with ink was left to stand for 3 months in a 60° C. thermostatic chamber and thereafter stood upside down on its cover to examine whether or not any deposit (precipitate) is seen on the bottom of the bottle.

AA: No precipitate at all.
A: A precipitate is slightly seen.
C: A precipitate is seen.

Color tone

Using a high-speed spectrophotometer CA-35, manufactured by Murakami Sikisai Gijutsu Kenkyusho, color difference was measured to determine a value of:

$$\sqrt{a^{*2} + b^{*2}}$$

wherein a* and b* are each a value measured according to JIS Z-8729, and a* represents a radish tint and b* a bluish tint. The closer to 0 the value of $\sqrt{a^{*2}+b^{*2}}$ is, the blacker the tone is. An ideal black tone is obtained particularly within the range of $$\sqrt{a^{*2} + b^{*2}} \leq 2.$$

Moisture retention

A cartridge for an ink-jet printer (trade name: BJ10V, manufactured by Canon Inc.) was filled with ink, and initial printing was carried out. Thereafter, the cartridge with ink was taken out of the body of the recording apparatus and left to stand at room temperature (25° C.) for 3 days, which was then again set in the recording apparatus to examine the state of printing after restoration was operated.

AA: Normal printing is possible after restoration is operated once or less.
A: Normal printing is possible after restoration is operated three times or less.
C: Normal printing is possible after restoration is operated 4 times or more, or normal printing is impossible without regard to how many times restoration is operated.

pH

Variations of the pH of ink immediately after its preparation and after its storage at 60° C. for 3 months were examined. The pH was measured using a pH meter HORIBA M-12, manufacture by Horiba Ltd.

Odor

Any odor of ink was examined.

Ejection stability

A cartridge for an ink-jet printer (trade name: BJ10V, manufactured by Canon Inc.) was filled with ink, and initial printing was carried out. Thereafter, the cartridge with ink was taken out of the body of the recording apparatus, and its recording solution ejection outlets were taped and further capped to fix the tape. This cartridge was then left to stand at 60° C. for 3 months and thereafter again set in the recording apparatus. After restoration was operated, printing was carried out until the ink run out, to examine ejection performance.

A: Ink is ejected from all the ejection outlets, printing is possible until the ink runs out, and the quality level of print characters does not differ from that before storage.
C: Some ejection outlets cause ink ejection failure or, although ink is ejected from all the ejection outlets, the quality level of print characters is greatly poorer than that before storage.

As recording mediums, NP-SK available from Sanyo-Kokusaku Pulp Co., Ltd. was used.

Examples 11 to 20 & Comparative Examples 4 to 6

Dispersions were prepared according to the following formulation and method, and thereafter inks were prepared according to the following ink formulation. The pH was measured, and was adjusted as occasion calls. The pH of each ink and results of evaluation are shown in Table 2.

(Example 11)
Preparation of pigment dispersion:

| | |
|---|---|
| Styrene/acrylic acid/butyl acrylate copolymer (acid value: 116; average molecular weight: 3,700) | 5 parts |
| 1,3-bis-(β-hydroxyethyl)urea | 1.4 parts |
| Ion-exchanged water | 68.6 parts |
| Diethylene glycol | 5 parts |

The above components were mixed, and the mixture was heated to 70° C. in a water bath to completely dissolve the resin component. To the resulting solution, 15 parts of carbon black (MCF88, available from Mitsubishi Chemical Industries Limited) anew produced for experiment and 5 parts of isopropyl alcohol were added, followed by premixing for 30 minutes and then dispersion treatment under the following conditions.

Dispersion machine: Sand grinder (manufactured by Igarashi Kikai K.K.)

Pulverizing media: Zirconium beads of 1 mm diameter
Pulverizing media packing: 50% (volume)
Pulverizing time: 3 hours.

Centrifugal separation was further carried out (12,000 rpm, 20 minutes) to remove coarse particles. A dispersion was thus prepared.

| Preparation of ink: | |
|---|---|
| Above dispersion | 30 parts |
| Diethylene glycol | 10 parts |
| Isopropyl alcohol | 3 parts |
| 1,3-bis-(β-hydroxyethyl)urea | 1 part |
| 2-Oxo-oxazolidine | 0.005 part |
| Ion-exchanged water | 56 parts |

| (Example 12) Preparation of pigment dispersion: | |
|---|---|
| Styrene/butyl acrylate copolymer (acid value: 120; average molecular weight: 6,100) | 2 parts |
| 1,3-bis-(β-hydroxyethyl)urea | 0.6 part |
| Ion-exchanged water | 70.4 parts |
| Diethylene glycol | 5 parts |

The above components were mixed, and the mixture was heated to 70° C. in a water bath to completely dissolve the resin component. To the resulting solution, 15 parts of carbon black (MOGUL L, available from CABOT Corp.) anew produced for experiment and 7 parts of ethyl alcohol were added, followed by premixing for 30 minutes and then dispersion treatment under the following conditions.

Dispersion machine: Sand grinder (manufactured by Igarashi Kikai K.K.)
Pulverizing media: Glass beads of 1 mm diameter
Pulverizing media packing: 50% (volume)
Pulverizing time: 3 hours.

Centrifugal separation was further carried out (12,000 rpm, 20 minutes) to remove coarse particles. A dispersion was thus prepared.

| Preparation of ink: | |
|---|---|
| Above dispersion | 30 parts |
| Triethylene glycol | 10 parts |
| Ethyl alcohol | 5 parts |
| 1,3-bis-(β-hydroxyethyl)urea | 10 parts |
| 2-Oxo-oxazolidine | 3 parts |
| Ion-exchanged water | 42 parts |
| The pH was adjusted using a citric acid/sodium citrate (1:9) solution. | |

| (Example 13) Preparation of pigment dispersion: | |
|---|---|
| Styrene/acrylic acid/ethyl acrylate copolymer (acid value: 138; weight average molecular weight: 5,600) | 4 parts |
| 1,3-bis-(β-hydroxyethyl)urea | 1.5 parts |
| Ion-exchanged water | 69.5 parts |
| Diethylene glycol | 5 parts |

The above components were mixed, and the mixture was heated to 70° C. in a water bath to completely dissolve the resin component. To the resulting solution, 15 parts of carbon black (MCF88, available from Mitsubishi Chemical Industries Limited) anew produced for experiment and 5 parts of ethyl alcohol were added, followed by premixing for 30 minutes and then dispersion treatment under the following conditions.

Dispersion machine: Sand grinder (manufactured by Igarashi Kikai K.K.)
Pulverizing media: Glass beads of 1 mm diameter
Pulverizing media packing: 50% (volume)
Pulverizing time: 3 hours.

Centrifugal separation was further carried out (12,000 rpm, 20 minutes) to remove coarse particles. A dispersion was thus prepared.

| Preparation of ink: | |
|---|---|
| Above dispersion | 30 parts |
| Glycerol | 5 parts |
| Ethylene glycol | 5 parts |
| Isopropyl alcohol | 5 parts |
| 1-Mono-γ-hydroxypropyl-3-mono-(β-hydroxyethyl)urea | 5 parts |
| 2-Oxo-oxazolidine | 0.3 part |
| Ion-exchanged water | 51.7 parts |
| The pH was adjusted using a citric acid/sodium citrate (1:9) solution. | |

| (Example 14) | |
|---|---|
| The same dispersion as in Example 11 | 30 parts |
| Diethylene glycol | 10 parts |
| Isopropyl alcohol | 5 parts |
| 1,3-bis-(β-hydroxyethyl)urea | 4 parts |
| 2-Oxo-oxazolidine | 0.4 part |
| Ion-exchanged water | 50.6 parts |
| The pH was adjusted using a citric acid/sodium citrate (1:9) solution. | |

| (Example 15) | |
|---|---|
| The same dispersion as in Example 12 | 30 parts |
| Diethylene glycol | 5 parts |
| Sulfolane | 5 parts |
| Ethyl alcohol | 5 parts |
| 1,3-bis-(β-hydroxyethyl)urea | 3 parts |
| 2-Oxo-oxazolidine | 0.3 part |
| Ion-exchanged water | 50.7 parts |
| 10% Surfy-nol solution | 1 part |
| The pH was adjusted using a citric acid/sodium citrate (1:9) solution. | |

| (Example 16) | |
|---|---|
| The same dispersion as in Example 13 | 30 parts |
| Polyethylene glycol 300 | 5 parts |
| Dimethylformamide | 5 parts |
| Isopropyl alcohol | 5 parts |
| 1-Mono-γ-hydroxypropyl-3-mono-(β-hydroxyethyl)urea | 5 parts |
| 2-Oxo-oxazolidine | 1.5 parts |
| Ion-exchanged water | 48.5 parts |
| The pH was adjusted using a citric acid/sodium citrate (1:9) solution. | |

| (Example 17) | |
|---|---|
| The same dispersion as in Example 11 | 30 parts |
| Triethylene glycol | 10 parts |
| Isopropyl alcohol | 5 parts |
| 1-Mono-β-hydroxypropyl-3,3-bis-(β-hydroxyethyl)urea | 5 parts |
| 2-Oxo-oxazolidine | 1 part |
| Ion-exchanged water | 49 parts |
| The pH was adjusted using a citric acid/sodium citrate (1:9) solution. | |

| (Example 18) | |
|---|---|
| The same dispersion as in Example 12 | 30 parts |
| Diethylene glycol | 5 parts |
| 2-Pyrrolidone | 5 parts |
| Ethyl alcohol | 5 parts |
| 1-Mono-β-hydroxypropyl-3,3-bis-(γ-hydroxypropyl)urea | 5 parts |
| 2-Oxo-oxazolidine | 1 part |
| Ion-exchanged water | 49 parts |
| The pH was adjusted using a citric acid/sodium citrate (1:9) solution. | |

| (Example 19) | |
|---|---|
| The same dispersion as in Example 11 | 30 parts |
| Diethylene glycol | 10 parts |
| Isopropyl alcohol | 3 parts |
| 1,3-bis-(β-hydroxyethyl)urea | 5 parts |
| Ion-exchanged water | 52 parts |
| The pH was adjusted using a citric acid/sodium citrate (1:9) solution. | |

| (Example 20) | |
|---|---|
| The same dispersion as in Example 11 | 30 parts |

-continued

| | |
|---|---|
| Diethylene glycol | 10 parts |
| Isopropyl alcohol | 3 parts |
| 1-Mono-γ-hydroxypropyl-3-mono-(β-hydroxyethyl)urea | 5 parts |
| Ion-exchanged water | 52 parts |

The pH was adjusted using a citric acid/sodium citrate (1:9) solution.

(Comparative Example 4)

| | |
|---|---|
| The same dispersion as in Example 11 | 30 parts |
| Diethylene glycol | 10 parts |
| Isopropyl alcohol | 5 parts |
| Ion-exchanged water | 50 parts |
| Urea | 5 parts |

(Comparative Example 5)

| | |
|---|---|
| The same dispersion as in Example 11 | 30 parts |
| Diethylene glycol | 10 parts |
| Isopropyl alcohol | 3 parts |
| 1,3-bis-(β-hydroxyethyl)urea | 20 parts |
| Ion-exchanged water | 37 parts |

(Comparative Example 6)

| | |
|---|---|
| The same dispersion as in Example 11 | 30 parts |
| Diethylene glycol | 10 parts |
| Isopropyl alcohol | 3 parts |
| 1,3-bis-(β-hydroxyethyl)urea | 5 parts |
| Ion-exchanged water | 52 parts |

The pH was adjusted using a citric acid/sodium citrate (1:9) solution.

Carrying out ink-jet recording by using the ink of the present invention causes no bronze phenomenon in print characters and also causes no precipitate in ink even after long-term storage. Good moisture retention and ejection stability and a high dissolving performance to dyes can also be achieved and pH changes of ink can be small, which are comparable or superior to those of urea- or thiourea-containing inks. In the case when black ink is used, an ideal black image can be obtained and also sharp and good images with a high image density can be obtained.

EXAMPLES 21 to 23

According to the following formulation, all the components were mixed and stirred. Thereafter the pH was measured and the pH was adjusted as occasion calls. Inks were thus prepared. The pH of each ink and results of evaluation are shown in Table 3.

(Example 21)

| | |
|---|---|
| Yellow dye with the following structure | 3 parts |

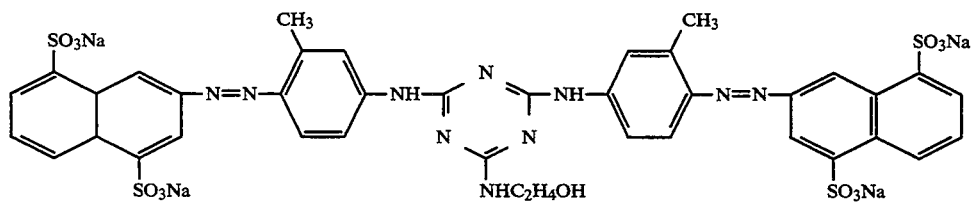

| | |
|---|---|
| Diethylene glycol | 10 parts |
| Isopropyl alcohol | 3 parts |
| 1,3-Bis(β-hydroxyethyl)urea | 5 parts |
| Ion-exchanged water | 79 parts |

The pH was adjusted using a citric acid/sodium citrate (1:9) solution.

(Example 22)

| | |
|---|---|
| Magenta dye with the following structure | 3 parts |

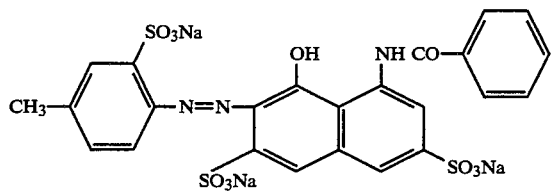

| | |
|---|---|
| Diethylene glycol | 10 parts |
| Isopropyl alcohol | 3 parts |
| 1,3-Bis(β-hydroxyethyl)urea | 5 parts |
| Ion-exchanged water | 79 parts |

The pH was adjusted using a citric acid/sodium citrate (1:9) solution.

(Example 23)

| | |
|---|---|
| Cyan dye with the following structure | 3 parts |

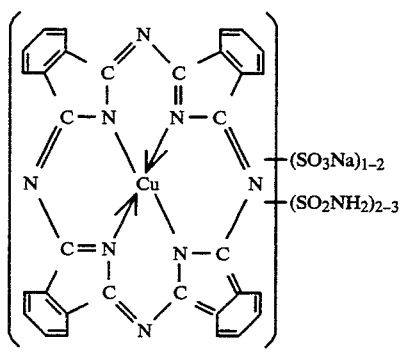

| Diethylene glycol | 10 parts |
|---|---|
| Isopropyl alcohol | 3 parts |
| 1,3-Bis(β-hydroxyethyl)urea | 5 parts |
| Ion-exchanged water | 79 parts |

The pH was adjusted using a citric acid/sodium citrate (1:9) solution.

EXAMPLE 24

Color recording was carried out using the black ink of Example 1, the yellow ink of Example 21. the magenta ink of Example 22 and the cyan ink of Example 23. As a result, a full-color image with a high quality level was obtained.

TABLE 1

| | pH | | Bronz-ing** | Stor-age stabi-lity | Color tone | Mois-ture reten-tion | Odor | Ejec-tion sta-bility |
|---|---|---|---|---|---|---|---|---|
| | (1) | (2) | | | | | | |
| Example: | | | | | | | | |
| 1 | 8.3 | 8.7 | 40 | A | 1.8 | AA | None | A |
| 2 | 8.7 | 9.0 | 40 | A | 1.7 | AA | None | A |
| 3 | 7.1 | 7.3 | 38 | A | 2.0 | A | None | A |
| 4 | 9.5 | 9.8 | 40 | AA | 1.8 | AA | None | A |
| 5 | 8.5 | 8.8 | 40 | AA | 1.5 | AA | None | A |
| 6 | 8.8 | 9.0 | 40 | AA | 1.8 | AA | None | A |
| 7 | 8.3 | 8.5 | 40 | AA | 1.8 | AA | None | A |
| 8 | 8.1 | 8.5 | 40 | AA | 1.9 | AA | None | A |
| 9 | 8.3 | 8.6 | 40 | AA | 1.8 | AA | None | A |
| 10 | 8.5 | 8.8 | 40 | AA | 1.8 | AA | None | A |
| Comparative Example: | | | | | | | | |
| 1 | 7.5 | 9.5 | 0 | A | 3.1 | A | * | A |
| 2 | 11 | 11 | 40 | A | 2.0 | AA | None | C |
| 3 | 6.5 | 6.0 | 40 | C | 1.9 | C | None | |

(1): Initial,
(2): After three months
*Odor of ammonia
**Number of persons who note no bronzing

TABLE 2

| | pH | | Stor-age stabi-lity | Mois-ture reten-tion | Odor | Ejec-tion sta-bility |
|---|---|---|---|---|---|---|
| | Initial | After 3 months | | | | |
| Example: | | | | | | |
| 11 | 8.5 | 8.6 | A | A | None | A |
| 12 | 7.2 | 7.8 | AA | A | None | A |
| 13 | 9.4 | 9.8 | AA | AA | None | A |
| 14 | 8.5 | 9.3 | AA | AA | None | A |
| 15 | 9.4 | 9.8 | AA | AA | None | A |
| 16 | 8.7 | 9.0 | AA | AA | None | A |
| 17 | 8.5 | 8.8 | AA | AA | None | A |
| 18 | 8.4 | 8.8 | AA | AA | None | A |
| 19 | 8.3 | 8.7 | A | AA | None | A |
| 20 | 8.5 | 8.7 | A | AA | None | A |
| Comparative Example: | | | | | | |
| 4 | 7.5 | 9.5 | C | A | * | C |
| 5 | 11 | 11 | A | AA | None | C |
| 6 | 6.5 | 6.0 | C | C | None | C |

*Odor of ammonia

TABLE 3

| | pH | | Stor-age stabi-lity | Mois-ture reten-tion | Odor | Ejec-tion sta-bility |
|---|---|---|---|---|---|---|
| | Initial | After 3 months | | | | |
| Example: | | | | | | |
| 21 | 8.5 | 8.8 | AA | AA | None | A |
| 22 | 8.4 | 8.7 | AA | AA | None | A |
| 23 | 8.6 | 8.8 | AA | AA | None | A |

What is claimed is:

1. An ink containing a dye or a pigment as a recording agent and a liquid medium capable of dissolving or dispersing the recording agent, wherein said ink comprises a compound represented by the formula $$R_1R_2NCONHCH_2CH_2OH$$

wherein $R_1$ and $R_2$ each represent hydrogen or $C_nH_{2n}OH$, where n is 2 or 3, provided that $R_1$ and $R_2$ are not hydrogen at the same time, said compound being provided in an amount of from 0.1 to 10% by weight based on the total weight of said ink, and 2-oxo-oxazolidine is provided in an amount of from 0.5 to 30% by weight based on the total weight of said ink, and said ink has a pH value ranging from 7 to 10.

2. The ink according to claim 1, wherein said compound represented by the above formula is 1,3-bis-(β-hydroxyethyl)urea.

3. The ink according to claim 1, wherein said recording agent comprises a dye selected from the group consisting of a phthalocyanine dye, a xanthene dye, a triphenylmethane dye, an anthraquinone dye, a monoazo dye, a disazo dye, a trisazo dye and a tetraazo dye.

4. The ink according to claim 1, wherein said recording agent comprises a dye represented by formula I or II

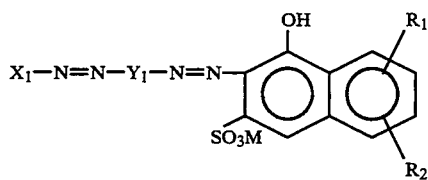 [I]

wherein $X_1$ represents

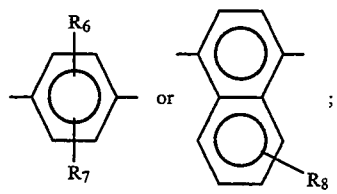

$Y_1$ represents

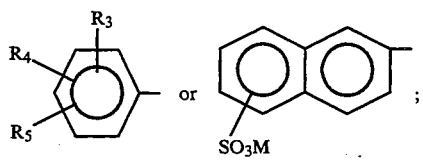

and $R_1$ and $R_2$ each represent —H, —$NH_2$,

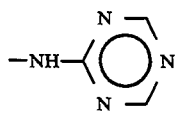

or —$SO_3M$; $R_3$, $R_4$ and $R_5$ each represent —H, —$SO_3H$, —$SO_3M$, —COOH, —COOM, —OH, —$NH_2$ or

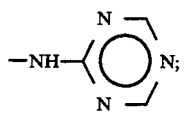

$R_6$ and $R_7$ each represent —H, —$OCH_3$, —$CH_3$, —$NH_2$ or —$NHCOCH_3$; and $R_8$ represent —H, —$SO_3H$ or —$SO_3M$ where M represents an alkali metal atom, ammonium or an amine, or $$W_2-N=N-X_2-N=N-Y_2-N=N-Z_2 \quad [II]$$

wherein $W_2$ represents

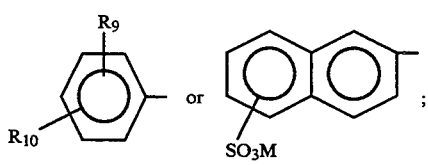

$X_2$ represents

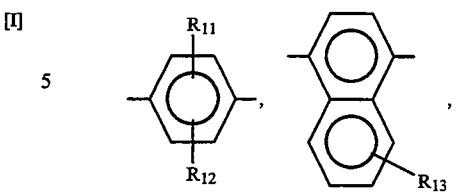

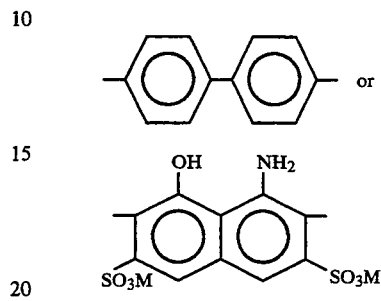

$Y_2$ represents

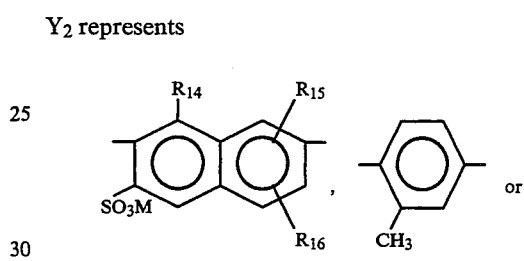

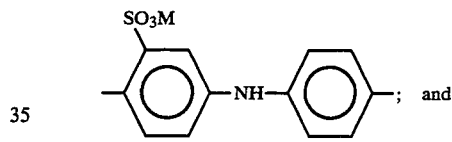

$Z_2$ represents

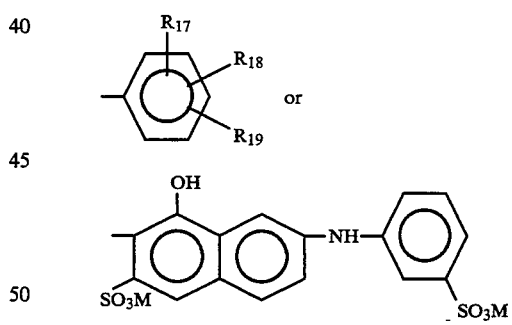

$R_9$ and $R_{10}$ each represent —H, —Cl, —$NH_2$, —$CH_3$, —$SO_3M$, —$NHCOCH_3$ or —$NHCONH_2$; $R_{11}$ and $R_{12}$ each represent —H or $OCH_3$; $R_{13}$ represents —H or —$SO_3M$; $R_{14}$, $R_{15}$ and $R_{16}$ each represent —H, —OH, —$SO_3M$ or —$NH_2$; $R_{17}$, $R_{18}$ and $R_{19}$ each represent —H, —OH, —$NH_2$, —$SO_3H$, —$SO_3M$, —$OCH_3$ or —$NHCONH_2$ where M represents an alkali metal atom, ammonium or an amine.

5. The ink according to claim 1, wherein said liquid medium comprises water and an organic solvent.

6. The ink according to claim 1, wherein said liquid medium comprises an organic solvent selected from the group consisting of methanol, ethanol, propanol and butanol.

7. An image forming process comprising the step of causing an ink to adhere to a recording medium to form an image, wherein said ink comprises a dye or a pigment as a recording agent, a liquid medium capable of dissolving or dispersing the recording agent, and a compound represented by the formula $$R_1R_2NCONHCH_2CH_2OH$$

wherein $R_1$ and $R_2$ each represent hydrogen or $C_nH_{2n}OH$, where n is 2 or 3, provided that $R_1$ and $R_2$ are not hydrogen at the same time, said compound being provided in an amount of from 0.1 to 10% by weight based on the total weight of said ink, and 2-oxo-oxazolidine is provided in an amount of from 0.5 to 30% by weight based on the total weight of said ink, and said ink has a pH value ranging from 7 to 10.

8. The image forming process according to claim 7, wherein said recording medium is a recording medium having a recording surface to which fibers are exposed.

9. An ink-jet recording process comprising the step of ejecting an ink in the form of ink droplets to perform recording, wherein said ink comprises a dye or a pigment as a recording agent, a liquid medium capable of dissolving or dispersing the recording agent, and a compound represented by the formula $$R_1R_2NCONHCH_2CH_2OH$$

wherein $R_1$ and $R_2$ each represent hydrogen or $C_nH_{2n}OH$, where n is 2 or 3, provided that $R_1$ and $R_2$ are not hydrogen at the same time, said compound being provided in an amount of from 0.1 to 10% by weight based on the total weight of said ink, and 2-oxo-oxazolidine is provided in an amount of from 0.5 to 30% by weight based on the total weight of said ink, and said ink has a pH value ranging from 7 to 10.

10. The ink-jet recording process according to claim 9, wherein said recording is a process in which a heat energy is acted on the ink to eject the ink droplets.

11. An ink-jet recording unit comprising an ink holder that holds an ink, and a head assembly for ejecting the ink in the form of ink droplets, wherein said ink is the ink according to any one of claims 1, 2 and 3 to 6.

12. The ink-jet recording unit according to claim 11, wherein said head assembly comprises a head in which a heat energy is acted on the ink to eject ink droplets.

13. An ink cartridge comprising an ink holder that holds an ink, wherein said ink is the ink according to any one of claims 1, 2 and 3 to 6.

14. An ink-jet recording apparatus comprising a recording unit comprising an ink holder that holds an ink, and a head assembly for ejecting the ink in the form of ink droplets, wherein said ink is the ink according to any one of claims 1, 2 and 3 to 6.

15. The ink-jet recording apparatus according to claim 14, wherein said head assembly comprises a head in which a heat energy is acted on the ink to eject ink droplets.

16. An ink-jet recording apparatus comprising an ink cartridge comprising an ink holder that holds an ink, and a recording head for ejecting the ink in the form of ink droplets, wherein said ink is the ink according to any one of claims 1, 2, and 3 to 6.

17. The ink-jet recording apparatus according to claim 16, having an ink feed assembly that feed to said recording head the ink held in the ink cartridge.

18. The ink-jet recording apparatus according to claim 16, wherein said recording head comprises a head in which a heat energy is acted on the ink to eject ink droplets.

* * * * *

UNITED STATES PATENT AND TRADEMARK OFFICE
CERTIFICATE OF CORRECTION

PATENT NO. : 5,354,369
DATED : 10/11/94
INVENTOR(S) : M. Shimomura, et al

Page 1 of 2

It is certified that error appears in the above-indentified patent and that said Letters Patent is hereby corrected as shown below: ON THE TITLE PAGE:

SECTION [56] References Cited

FOREIGN PATENT DOCUMENTS

"61-055552 11/1986 Japan" should be deleted.
"1203483   8/1989 Japan" should read --1-203483 8/1989 Japan--.
"2173168   7/1990 Japan" should read --2-173168 7/1990 Japan--.
"3234775   10/1991 Japan" should read --3-234775 10/1991 Japan--.
"4332777   11/1992 Japan" should read --4-332777 11/1992 Japan--.

COLUMN 1

Line 32, "1-6236." should read --1-6236).--.

COLUMN 2

Line 50, "to" (2nd occurrence) should be--,--.

COLUMN 14

Line 43, "diethanoi" should read --diethanol--.
Line 57, "a more" should read --an--.
Line 59, "alcohol" should read --alcohols--.

COLUMN 17

Line 9, "RS" should read --as--.

UNITED STATES PATENT AND TRADEMARK OFFICE
CERTIFICATE OF CORRECTION

PATENT NO. : 5,354,369
DATED : 10/11/94
INVENTOR(S) : M. Shimomura, et al

It is certified that error appears in the above-indentified patent and that said Letters Patent is hereby corrected as shown below:

COLUMN 20

Line 17, "manufacture" should read --manufactured--.
    Line 30, "run" should read --ran--.

COLUMN 27

Line 51, "represent" should read --represents--.

COLUMN 30

Line 29, "feed" should read --feeds--

Signed and Sealed this

Twelfth Day of September, 1995

Attest:

BRUCE LEHMAN

Attesting Officer      Commissioner of Patents and Trademarks